March 11, 1958 — G. D. MEIER ET AL — 2,826,240
REINFORCED CORNER FOR PLASTIC SHEETS AND METHOD OF MAKING SAME
Filed July 19, 1955

INVENTORS
Joseph A. Potchen
George E. Kloote
George D. Meier
BY Peter P. Price
ATTORNEY

United States Patent Office 2,826,240
Patented Mar. 11, 1958

2,826,240

REINFORCED CORNER FOR PLASTIC SHEETS AND METHOD OF MAKING SAME

George D. Meier and George E. Kloote, Grand Rapids, and Joseph A. Potchen, Marne, Mich., assignors, by mesne assignments, to Haskelite Manufacturing Corporation, a corporation of Delaware Application July 19, 1955, Serial No. 522,942

12 Claims. (Cl. 154—41)

This invention relates to laminated panels and similar members made wholly or largely of synthetic resin material. The invention is particularly concerned with the forming of structurally sound corners on such materials.

Where laminated panels or beams having a hard, resin face and a low density core are used, serious trouble sometimes occurs where the core is exposed at the panel's edge. This may occur when the panels are faced with a hard, resin facing only on two surfaces or when the panels are cut. An exposure of the core presents several problems. Where the core is of a low density, foamed material such as foamed polystyrene or a foamed polyisocyanate, it is subject to mechanical injury when exposed. Further, such core materials may be unstable in the presence of ultraviolet light or certain chemicals while they are entirely satisfactory if protected by an enclosing envelope of impermeable materials such as a polyester resin.

Where the core involves one or more lamina of wood or other hydroscopic material, the exposure of the core permits moisture to enter and accumulate within the hydroscopic material.

Another important consideration is that such core materials, when exposed, present an untidy and undesirable appearance. Heretofore, it has been conventional practice to cover such exposed edges with a channel section, the edges of which extend over and are bonded to the faces of the panel. This, however, is not desirable because it destroys the smooth surface of the panel and makes the panel unsatisfactory where ornamental appearance is important.

While is is possible to enclose the exposed edge of the panel with a strip of material similar to the facing sheet, such strips are subject to de-lamination as a result of mechanical injury because the core material, particularly where it is of the low density, foamed, synthetic resin type is weak in tension and the facing sheet may be readily peeled off when an object hooks under its edge. This type of core material does not resist penetration, readily permitting objects to hook under the facing sheet once they have been able to pass around the edge of the facing sheet.

It is the object of this invention to provide a construction whereby an edge band of facing material may be applied to the exposed edges of the panel which edge band will provide a smooth, neat and ornamental external appearance and, at the same time, will provide a corner joint highly resistant to mechanical injury. The joint will also provide a positive seal against penetration at the panel's corners.

This invention provides a corner construction which if it is chamfered excessively will not expose any of the core materials subjecting them either to vapor penetration or to mechanical injury. Further, by eliminating possible exposure of the core materials, the ornamental appearance of the panel is preserved.

These and other objects and advantages of this invention will be readily understood by those acquainted with the manufacture and use of laminated panels of basically synthetic resin material upon reading the following specification and the accompanying drawings.

Figure 1:
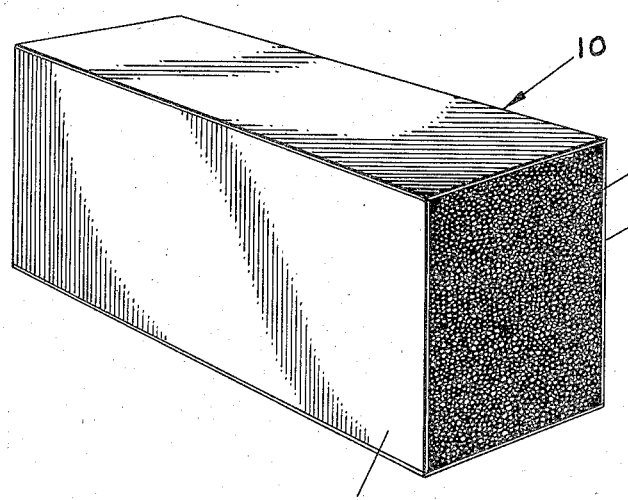
Fig. 1 is an oblique view of a structure incorporating this invention.

In executing the objects and purposes of this invention, we have chamfered the core material of the panel at the point of juncture of the existing facing sheet of the panel and a banding strip applied to enclose the exposed face of the core. This chamfer undercuts the existing facing sheet and underlies the banding strip to be placed on the panel. The pocket created by the chamfer is filled with an adhesive impervious to moisture and other substances to which it is expected the panel will be exposed. This adhesive must be one which adheres strongly to the facing sheets and to the core material.

Referring specifically to the drawings, the numeral 10 refers to an elongated, block-like structure having a low density cellular core 11 and a pair of facing sheets 12.

The core 11 may be of any suitable type of light weight, low density, cellular material. One such material is a foamed polystyrene such as those made by polymerizing a hydrocarbon or halo-hydrocarbon having a vinyl radical on an aromatic nucleus and include the products resulting from polymerization of styrene, monomethylstyrene, dimethylstyrene, vinyl naphthalene and the halogenated styrenes. Such foamed core material normally has a density in the range of two to ten pounds per cubic foot. The core may be of a foamed in situ reaction product of a polyisocyanate and a suitable polyester or alkyd resinous composition. An example of such a polyisocyanate is a meta-toluene-diisocyanate. This latter is but an exemplification because other aromatic polyisocyanates can be employed quite satisfactorily. Such light weight foamaceous core materials have rather poor resistance to tension loading. Thus, if one end of the facing sheet can be gripped and pulled back it will have a tendency to rip loose from the core by tearing the core adjacent the bond between the facing sheet and the core.

The facing sheets are of a hard, impervious resin material which may be securely bonded to the core material by a suitable resin of adhesive properties in which neither the facing sheet nor the core are readily soluble. A suitable resin for manufacture of the facing sheets is any one of the numerous commercially available polyester resins. The facing sheet is normally reinforced with a fibrous material such as filamentary glass in which the filaments are either oriented or arranged at random. Such facing sheets, when cured, have a thickness normally within the range of 0.015 to about 0.060 of an inch. The facing sheets 12 may be of the same thickness or they may be of different thicknesses depending upon the particular requirements of the installation in which the panel is to be used.

The facing sheets may be suitably bonded to the core with an epoxy resin adhesive hardenable at ambient or moderately elevated temperatures and under only sufficient pressure to assure firm contact between the facing sheet and the core during the curing period. This adhesive is the liquid, partially polymerized, high molecular weight, reaction product of a diphenol and an epoxy compound. One example of such a reaction product is that obtained by heating together 2,2'-bi(4-hydroxphenyl propane) and epichlorhydrin in the presence of an alkali such as sodium hydroxide, whereby there are formed polymeric glycidyl polyethers of the phenolic substance having properties and an average molecular weight depending upon the reaction conditions and the proportions of reactants employed. This is merely an example of one particular adhesive and it will be recognized that various other materials may be used without in any way affecting this invention.

These panels are normally made by first fabricating the facing sheets as hard, continuous lengths of flexible material. By suitable equipment, a pair of such facing sheets are bonded one to each side of the core material or, in the case of a foamed-in-place type material, the facing sheets are placed in a suitable machine and the core material foamed between them. In the case of most of the foamed-in-place polyisocyanate compounds, no adhesive is used since the core material itself acts as the bonding agent to the facing sheets. The panels, as they leave the panel forming machine, have two exposed edges to which no facing sheet is secured.

It will be recognized that while these panels are normally manufactured with two facing sheets, they are also fabricated with only one facing sheet. This invention is applicable to either type. In cases where the panels are entirely enclosed, as originally fabricated, this invention is useful where it is necessary to cut into the panels, exposing the core material.

Figure 2:
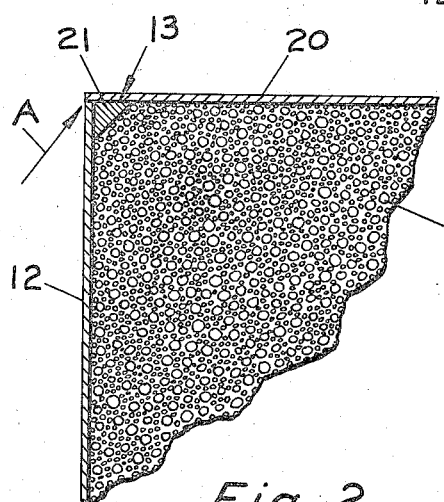
Fig. 2 is an enlarged, fragmentary, sectional view of a synthetic resin panel having a low density core and incorporating this invention.

A cover or banding strip 20 is used to enclose and protect the exposed face of the core. In preparation for mounting the banding strip 20, the core material 11 immediately adjacent the facing sheet 12 is removed to form a pocket 13 (Fig. 2). In making the pocket 13, the facing sheet 12 is undercut and the core is also removed. Core materials of this type may be removed by any suitable equipment such as a router. Where the core is of a low density foamed material such as a light weight, foamed polystyrene or a foamed polyisocyanate, the material is readily cut.

The banding or cover strip 20 is preferably of a material similar to the facing sheets 12. The thickness of the banding strip 20 may be more or less than that of the facing sheets 12, depending upon the particular conditions under which the panel is to be used. Before application of the banding strip 20, the pocket 13 is filled with a quantity of adhesive 21. An example of a suitable adhesive is an epoxy resin which will harden at ambient temperature and which, when hardened, forms a rigid, shock resistant, moisture impervious material forming a strong bond to the facing sheet 12, the banding strip 20 and the core 11. This adhesive should be one having no appreciable shrinkage during curing to prevent dimpling and malformation of the panel at the corner.

Particularly where the application is made on a corner in a vertical position, the adhesive 21 is normally loaded with any of several commercially available loading agents such as a silica or diatomaceous earth which acts as an extender and as a means of increasing the viscosity of the material. By the use of such materials, the viscosity of the adhesive may be increased to a level at which no appreciable flow or creep will occur even on vertical surfaces. This will cause the material to hold its form during application of the banding strip.

Before the adhesive 21 hardens, the banding strip is coated, on its inside face, with a suitable adhesive. Preferably, this adhesive is indentical to the adhesive applied to the pocket 13 but may be of a higher viscosity to facilitate even spreading. The banding strip is then pressed firmly against the edge of the panel.

Preferably, the banding strip 20 is, as originally applied, somewhat wider than the panel whereby a short length of it projects beyond each face of the panel. If adhesives of the type previously described are used, the adhesives will harden within a matter of hours at normal ambient temperatures. The edges of the banding strip 20 are then trimmed, such as by sanding, to make them flush with the facing sheet 12. Should the trimming be inadvertently made too deep and the facing sheet or the banding strip cut through to expose the interior of the panel, the block of adhesive 21 will be exposed rather than the core. Since this adhesive cures to a hard, shock resistant block, this will not expose the core to mechanical injury. Further, the adhesive may be tinted to a color blending with the facing sheet 12 and banding strip 20. Thus, its exposure will not be readily visible and the ornamental appearance of the panel will be preserved.

This arrangement provides a firm anchor at the corner for both the banding strip 20 and the facing sheet 12. The bond normally formed between the epoxy type resins and the polyester type facing sheets, is not subject to de-lamination under normal mechanical injury. Even though the corner is struck a sharp blow there will be no tendency to de-laminate since a load applied in the direction of the arrow "A" in Fig. 2 will be distributed by the facing sheet 12 and transmitted to the core in shear. The bond between the facing sheet and the core has high resistance to shear loads. Thus, the weakness of this bond under tension loading is avoided. It is for this reason important that the block of adhesive 21 extend a short distance such as from 2 to 5/10 of an inch back under both the facing sheet and the banding strip to provide the proper bond for supporting the sheets at the corner. This provides a corner highly resistant to mechanical injury.

Figure 3:
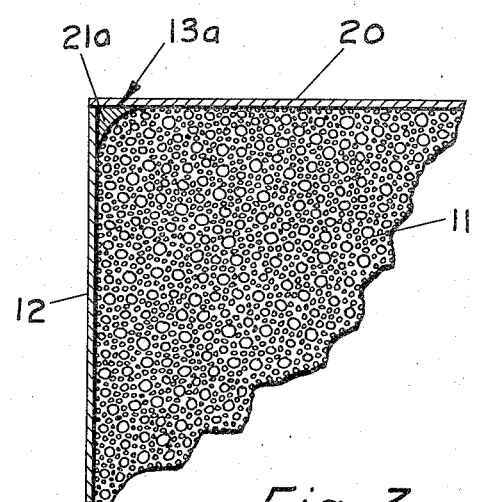
Fig. 3 is an enlarged, fragmentary, sectional view of a panel having a low density core and incorporating a modified form of this invention.

Fig. 3 illustrates a slight modification of this invention wherein the cavity 13a instead of being of triangular shape is formed by rounding the edge corner on the core 11. This makes the adhesive block 21a somewhat thinner. However, the ends of the adhesive extend the same distance under both the facing sheet 12 and the banding strip 20. Again, objects striking the corner which would normally have a tendency to tear either the facing sheet or the banding strip from the core are dissipated as shear loads through the block of adhesive 21.

Figure 4:
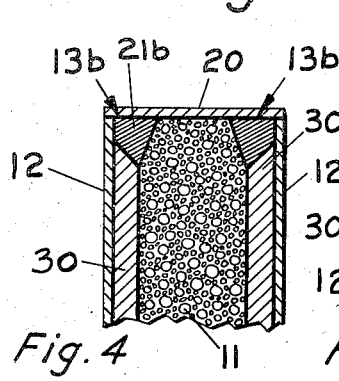
Fig. 4 is a fragmentary, sectional view of a panel having a low density core and a high density lamina between the facing sheets and the core showing the application of this invention.
Figure 5:
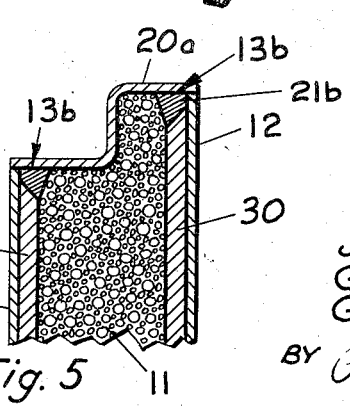
Fig. 5 is a fragmentary, sectional view of a modified form of the corner construction illustrated in Fig. 4.

Figs. 4 and 5 illustrate the application of this invention to panels in which a high density lamina is provided immediately beneath one or both of the facing sheets. Thus, the panel consists of a pair of facing sheets 12, a low density core 11 and a high density lamina 30 between the core and either one or both of the facing sheets 12. The lamina 30 may be a high density, foamed polystyrene or a high density foamed polyisocyanate or it may be of a totally different material such as plywood or a ligneous hardboard such as that sold under the trademark "Masonite."

Such high density laminae are used where it is desired to increase the panel's resistance to surface indentation such as that which would be caused by crushing loads or high impact forces. While the low density core materials, particularly the foamed, synthetic resin materials of the inner core 11, have sufficient resistance to crushing loads for many applications, their failure point in compression is below that necessary where the panels are applied as flooring or where heavy or sharp objects are likely to strike the panel with appreciable force. In this case, the high density lamina 30 serves both to resist penetration by such forces and to distribute concentrated loads over a wide area so that the ultimate compressive strength of the low density core 11 is not reached.

In this case, the pocket 13b is formed by chamfering off a corner of the low density core material 11 and at the same time removing a portion of the high density lamina 30 adjacent the edge of the facing sheet 12. Sufficient of the lamina 30 is removed to undercut the facing sheet 12 a short distance. The facing sheet is so trimmed that its edge is sharply inclined or undercut inwardly whereby a V-shaped pocket is formed with its apex at the bond between the core 11 and the lamina 30.

The pocket 13b is, like the pockets 13 and 13a, filled with a suitable adhesive 21b of the same type as that used in the constructions illustrated in Figs. 2 and 3. By shaping the pocket 13b as a narrow V having its apex substantially on the bond line between the core 11 and the lamina 30, loads applied to the corner are distributed in shear not only to the facing sheet 12 but to a large extent in shear both to the core 11 and to the lamina 30. As has been previously pointed out, materials of the type used in these panels exhibit far superior resistance to shear loadings than they do to tension loadings along joint lines. The cover or banding strip 20 applied to the exposed edge of the panel is identical to the banding strip 20 illustrated in Figs. 2 and 3 and is applied in the same manner.

Another advantage obtained by trimming back the high density laminae 30 to a point where the facing sheet 12 is, to some extent, undercut, is that in finish trimming the banding strip 20 should the trimming be inadvertently carried to a point where the facing sheet at the corner is entirely removed, the high density core material will not be exposed. Where this is a high density cellular, synthetic resin material, this protects the lamina 30 from mechanical injury. Where the lamina 30 is of wood or hardboard, both of which are hygroscopic, the moisture tight seal formed by the facing sheets and the adhesive block 13b will be preserved and the penetration of moisture into the lamina 30 will be prevented. This is particularly important where the panels are used as thermal insulation, involving a temperature differential across the panels' thickness inducing the rapid migration of moisture at any point where it may contact a hygroscopic or water permeable material.

Fig. 5 illustrates a corner joint arrangement similar to that shown in Fig. 4, except it illustrates the fact that the banding strip need not necessarily be a flat sheet. In the particular application illustrated in Fig. 5, the banding strip is of generally Z-shape, thus permitting the panels to have a lapped joint or where the banding strip is applied to the edge of an opening such as that used for a window or door, it will provide a blind stop. Such shaping of the banding strip will not in any way impair the effectiveness of the particular joint forming the subject matter of this invention.

While we have described a preferred embodiment of our invention and several modifications thereof, it will be recognized that other modifications of this invention may be made without departing from the principles thereof. Such modifications are to be considered as included in the hereinafter appended claims unless these claims by their language expressly state otherwise.

We claim:

1. The method of reinforcing the edge of a laminated panel having an internal light-weight cellular body and a facing sheet, which comprises the steps of creating a cavity in said edge immediately adjacent said facing sheet by removing a corner portion of said body, filling said cavity with an adhesive bondable to said body and said facing sheet, adhesively bonding to said edge a strip of material of a size and shape adapted to cover said edge thereby causing said strip to firmly contact and bond to said adhesive in said cavity, and curing said adhesive to a rigid shock-resistant form.

2. The method of reinforcing the edge of a laminated panel having an internal light-weight cellular body and a facing sheet, which comprises the steps of creating a cavity in said edge immediately adjacent said facing sheet by removing a corner portion of said body, filling said cavity with an adhesive bondable to both said core and facing sheet, providing a strip of material of a size and shape greater than that necessary to cover said edge, adhesively bonding said strip to said edge thereby causing said strip to firmly contact and bond to said adhesive in said cavity, and curing said adhesive to a rigid, shock resistant form, and trimming said strip flush with the face of said panel.

3. A method of enclosing the edge of a laminated panel having a core, a subsurface lamina, and a facing sheet, comprising the steps of creating a cavity in said edge immediately adjacent said facing sheet by removing a corner portion of said core and a corner portion of the edge of said subsurface lamina filling said cavity with an adhesive bondable to said core, subsurface lamina, and facing sheet, and adhesively bonding to said edge a strip of a size and shape adapted to cover said edge thereby causing said strip to firmly contact and bond to said adhesive in said cavity.

4. In a corner construction for a laminated panel having a body of light-weight cellular material and an impervious facing sheet adhesively secured to said body forming at their edges an exposed laminated edge, the improvement comprising a cavity in said body at the juncture of the edges of said body and sheet extending a distance toward the center and along the edge of said sheet and a distance laterally and longitudinally along said exposed laminated edge, said cavity being filled with a bead of shock-resistant adhesive bonded to said sheet and said body, and a strip overlying said bead adhesively secured to said edge and thereby to said bead, said sheet and said body.

5. A laminated panel having a body of light-weight cellular material, a thin facing sheet bonded thereto, and a laminated edge where said body is exposed, said laminated edge being reinforced by a bead of hard shock-resistant synthetic resin located at the corner of said edge immediately adjacent and under said facing sheet and a strip of sheet-like material overlying said bead, said bead being bonded directly to said facing sheet, said strip, and said body.

6. A reinforced corner construction for a laminated panel having a core and a facing sheet adhesively secured to said core forming at their edges an exposed laminated edge, comprising a cavity in said core at the juncture of the edges of said core and sheet extending a distance toward the center and along the edge of said sheet and a distance laterally and longitudinally along said exposed laminated edge, said cavity being filled with a bead of shock-resistant adhesive bonded to said sheet and said core, and a strip of sheet-like material overlying said bead adhesively secured to said bead, said sheet and said core.

7. In a laminated panel having a core, a subsurface lamina bonded to said core, a thin facing sheet bonded to said subsurface lamina, said core, said subsurface lamina and said sheet forming at their edges an exposed laminated edge, means for enclosing said exposed laminated edge comprising: a strip of sheet-like material; said core and said subsurface lamina having portions terminating short of the edge of said facing sheet forming a cavity in said laminated edge; immediately adjacent said facing sheet a bead of hard, shock-resistant synthetic resin filling said cavity and bonded directly to said facing sheet, subsurface lamina and core; said strip being bonded to said laminated edge, thereby being adhesively secured to said facing sheet, said bead and said core.

8. The laminated panel of claim 7 wherein the sides of said cavity converge away from the laminated edge forming an apex lying on the line of contact between said subsurface laminae and said core.

9. The method of enclosing the edges of a laminated panel having an internal body and a facing sheet, the steps which include: creating a cavity in said edge immediately adjacent said facing sheet by removing a corner portion of said body; filling said cavity with an adhesive bondable to said body and said facing sheet; adhesively bonding to said edge a strip of material of a size and shape adapted to cover said edge; applying sufficient pressure to said strip to hold said strip in firm contact with said body and said adhesive in said cavity, curing said adhesive at room temperature.

10. The method of enclosing the edges of a laminated panel having an internal body and a facing sheet, the steps which include: creating a cavity in said edge immediately adjacent said facing sheet by removing a corner portion of said body; filling said cavity with an adhesive bondable to said body and said facing sheet; adhesively bonding to said edge a strip of material of a size and shape adapted to cover said edge thereby causing said strip to firmly contact and bond to said adhesive in said cavity; curing said adhesive at room temperature.

11. The method of enclosing the edges of a laminated panel having an internal body and both a surface facing sheet and an edge facing sheet, said facing sheets meeting at a sharp corner, the steps which include: creating a cavity in said edge immediately beneath said facing sheets at said corner by removing a corner portion of said body; filling said cavity with an adhesive bondable to said body and said facing sheets; adhesively bonding to said edge a strip of material of a size and shape adapted to cover said edge; applying sufficient pressure to said strip to hold said strip in firm contact with said body and said adhesive in said cavity until said adhesive is cured; applying sufficient pressure to both of said facing sheets to effect firm contact between said facing sheets and said adhesive; curing said adhesive.

12. A laminated panel in accordance with claim 5 wherein said light-weight cellular material is foamed polystyrene, said facing sheet is a polymerized polyester resin, and said bead is a cured epoxy resin.

References Cited in the file of this patent

UNITED STATES PATENTS

| | | |
|---|---|---|
| 1,766,659 | Leslie | June 24, 1930 |
| 1,824,537 | De Correvont | Sept. 22, 1931 |
| 2,013,865 | Sloan | Sept. 10, 1935 |
| 2,392,734 | Haberstump | Jan. 8, 1946 |